(12) United States Patent
Peguero (10) Patent No.: US 8,336,538 B2
(45) Date of Patent: Dec. 25, 2012

(54) SOLAR HEAT COLLECTOR MODULE (76) Inventor: Fernando A. Peguero, Yorktown Heights, NY (US)

( * ) Notice: Subject to any disclaimer, the term of this patent is extended or adjusted under 35 U.S.C. 154(b) by 0 days.

(21) Appl. No.: 13/187,921

(22) Filed: Jul. 21, 2011

(65) Prior Publication Data
US 2011/0277750 A1 Nov. 17, 2011

(51) Int. Cl.
F24J 2/22 (2006.01)
(52) U.S. Cl. ........ 126/675; 126/666; 126/624; 126/625; 126/640; 126/646; 29/890.033; 29/428; 52/309.9
(58) Field of Classification Search .................. 126/666, 126/675, 625, 646, 640, 678, 661, 570, 673, 126/667, 624; 29/890.033, 428; 52/309.9
See application file for complete search history.

(56) References Cited

U.S. PATENT DOCUMENTS

| 3,145,707 | A |   | 8/1964  | Thomason         |         |
|-----------|---|---|---------|------------------|---------|
| 3,495,363 | A | * | 2/1970  | Johnson          | 52/60   |
| 3,555,756 | A |   | 1/1971  | Curran et al.    |         |
| 4,056,094 | A |   | 11/1977 | Rosenberg        |         |
| 4,182,308 | A |   | 1/1980  | Reynolds         |         |
| 4,232,658 | A | * | 11/1980 | Gessford         | 126/648 |
| 4,237,971 | A |   | 12/1980 | Olsson et al.    |         |
| 4,243,020 | A | * | 1/1981  | Mier             | 126/670 |
| 4,245,620 | A |   | 1/1981  | Heinemann        |         |
| 4,325,359 | A |   | 4/1982  | Fries            |         |
| 5,167,218 | A | * | 12/1992 | Deakin           | 126/569 |
| 5,323,763 | A | * | 6/1994  | Lechner          | 126/626 |
| 5,431,149 | A |   | 7/1995  | Fossum et al.    |         |
| 5,575,276 | A |   | 11/1996 | Fossum et al.    |         |
| 6,730,841 | B2| * | 5/2004  | Heckeroth        | 136/251 |
| 2004/0060555 | A1 |   | 4/2004 | Keiser          |         |

FOREIGN PATENT DOCUMENTS

GB 2099134 A 12/1982
JP 58224262 A2 12/1983

* cited by examiner

Primary Examiner — Steven B McAllister
Assistant Examiner — Avinash Savani
(74) Attorney, Agent, or Firm — Patent Analysis Research Tech. Sys. LLC; George L. Walton (57) ABSTRACT A solar cell collector unit that materially contributes to a more efficient use and conservation of green energy includes a first metal sheet having alternating corrugated crest and valley portions on an upper surface and alternating open channels on an under surface and having a first dimension with a first peripheral edge about its entire perimeter. A second substantially flat metal sheet having a second dimension with a second peripheral edge about its entire perimeter and less than the first dimension. The first and second metal sheets overlie one another with flattened copper tubing disposed within the open channels and sandwiched there between, while crimping and folding the first peripheral edge over the second peripheral edge to form nested protuberances about its perimeter to provide stiffness and rigidity there about and forming a low cost single solar cell unit. Then deformation along the valley portions and a portion of the second metal sheet forms plural pin-less rivets thereon to provide additional stiffness and rigidity.

19 Claims, 6 Drawing Sheets

SOLAR HEAT COLLECTOR MODULE

CROSS REFERENCE TO RELATED APPLICATION(S)

NONE

BACKGROUND OF THE INVENTION

1. Field of the Invention

The present invention relates to a collector module unit, known as a PYROPEG solar cell module unit, for absorbing heat from incident solar energy and removing the absorbed heat by a heat transfer liquid, and particularly to a low cost solar cell module design and method of fabrication and assembling of a linear solar cell collector module unit. Such low cost solar cell module design and method of fabrication and assembling materially contributes to a more efficient use and conservation of energy that becomes accessible to many more people through out the world, especially those in underserved areas and communities. This lends too many more people using solar as an alternative green energy source, which automatically reduces greenhouse gases, thereby enhancing the quality of the environment.

2. Description of the Related Art

Due to ever increasing usage of non-renewable energy sources such as fossil fuels, much attention is being directed toward solar energy. Solar energy has been found to be effective in providing space and water heating.

In the prior art, many solar heat collectors are attractive in performance but lack in cost-effectiveness in design, fabrication and assembling. Many of the prior art solar heat collector systems require several years of operation to return the initial investment, turning many potential users away from solar energy as an alternative energy source. Therefore, there is a huge need for a simple, efficient and most importantly, an inexpensive solar heat collector module unit.

Over the years, many patents have been issued for collecting and transferring solar heat energy. Some of the solar collector module units of these patents generally have their components located within an enclosure comprising one or more elongated, generally rectangular heat absorbing metallic panels, each comprising two relatively thin plates of heat absorbing metal, such as aluminum or copper, which are deformed to tightly enclose about a plurality of parallel heat transfer pipes, preferably made of copper. The upper plate of heat absorbing metal covers substantially the top semi-cylindrical portions of the heat transfer fluid conducting pipes, while the lower plate is deformed to surround the bottom semi-cylindrical portions of the fluid transfer pipes.

The plates and pipes are secured together by a plurality of metallic rivets, staples or other means, preferably of stainless steel, which traverses the edges of the pipe enclosing deformed portions of the two plates. Thus, the pipes are effectively resiliently secured in position, thereby readily accommodating differences in expansion of the plates and the heat transfer fluid pipes.

The frame for embodying these solar collector module units are fabricated from U-shaped stainless steel of aluminum channels which are bolted or welded together. The ends of the plates are bolted to oppose channels. Headers for the heat transfer fluid conduits are welded to opposite ends of the plates, hence permitting a single passage of heat transfer fluid across the length of the heat absorbing plates or, by appropriate design of the internal configuration of the headers.

This design arrangement allows the heat transfer fluid to be directed along one portion of the heat absorbing plates in one direction to a second header and returned along the remaining portion of the heat absorbing plates in the opposite direction to exit from a first header at the same end that the heat transfer fluid entered the first header. In addition, conventional pads of rigid foam type insulation may be supported by bottom frame elements secured to the channels beneath the heat absorbing plates. A standard dimension of glazing material, such as glass or suitable transparent plastic, may be sealingly secured to the top surfaces of the channels forming the frame for the solar collector module units.

In another prior art solar collector heat exchanger unit design, manufacture of such solar collector heat exchanger units are made in a very simple way by a mechanical rolling process. This process is defined by a rolling device with a groove means for compressing a pair of aluminum strips and a copper pipe lying between the pair of aluminum strips. The rolling device includes a pair of rollers and grooves disposed therein and are positioned directly opposite one another and having a shape corresponding to the shape of a pipe that is fed between the aluminum strips, so that a heat exchanger member with a greater total wall thickness at the pipe portion than at the fin portion is obtained after the passage of the strips and the copper pipe between the rollers.

Also, a guide means is positioned in front of the rollers and there between for supporting the pipe as the strips and the pipe are fed between the pair of rollers, so that the copper pipe is fed centrally to the grooves in the rolls.

Note that it is not necessary that the rolling process application have to include the pair of separate sheet strips, but it can be a single strip sheet that can be folded along its middle for forming two strip portions can be utilized just as well. Each of the separate strips or strip portions can have mating pre-deformed cavities for receiving the flattened or deformed pipe or one of the folded strips can be substantially flat without a pre-deformed cavity and the other folded strip can have a pre-deformed cavity for receiving a pre-deformed cavity having a closed loop configuration so that only one sheet abuts against the copper pipe and welded thereto. Additionally, the folded strip sheet with the closed loop configuration should have a larger width from the beginning, so that this folded strip sheet after the pre-deformation has substantially same width as the other substantial flat strip folded sheet without the pre-deformed cavity.

This permits the peripheral edged to be substantially the same. At one end of the strip sheets, a raised peripheral edge defines a slot there between and spaced to receive the opposite edge of a similar solar collector unit to form a larger heat exchange module. The pre-deformed cavity in each of the separate sheets having a configuration that allows both sheets to abut against the pipe and are welded thereto Also, the copper pipe is pre-flattened in advance.

Another solar collector prior art type shows an upper corrugated-like upper plate panel with an array of crest and valley or dimple sections defining channels there between and a lower generally flat plate panel that is attached to the upper plate panel so that the channels will provide fluid flow paths there through between inlet and outlet fluid headers. The valleys or dimple sections are spot welded to the lower plate panel and the upper plate and lower plate panels are seam welded at their peripheral ends. This seam welding ensures that the volumes of the channel flow paths are water or fluid tight. Note that the valley or dimple sections could be arranged in a rectangular array so that there are a number of parallel lateral flow passages intersected by a number of parallel longitudinal flow passages.

Also, the valley or dimple sections could be arranged in an array so that the flow passages extend in directions with both lateral and longitudinal components that are diagonally extending across the face of the solar collector. Also, it is well know that upper and lower plate panels may be corrugated or dimpled providing the requisite lateral and longitudinal flow paths there between.

This solar collector device includes a casing made of a material, such as, aluminum and comprising a base surrounded by upstanding peripheral walls and having an open top. The interior of the casing below the lower plate panel has insulating material such as polyurethane foam or the like disposed therein. A framework is mounted atop the side walls for closing and covering the open top by a glass sheet or light transparent member by a glazing gasket. The purpose of the glass sheet or light transparent member is to prevent the heated air from the vicinity of the upper plate panel or absorber plate panel from escaping the collector and being lost to the atmosphere.

In conventional solar collector units, the solar energy is incident on absorbed by a metallic plate having so-called "black body" coating thereon which effectively converts it to a black body type heat radiator. This black body surface is encased within a glazing of a transparent ceramic or plastic material and the inner surface of such glazing permits the transfer of light there through, but reflects back towards the heat absorbing black body plate substantially all infrared radiation emitted by the black body plate. As heat is developed in the black body plate, it is then transferred to the fluid pipes or fluid flow paths or channels disposed between the upper and lower plate panels. A layer of insulation is disposed below and/or surrounding the lower surface of the black body plate and the pipes and the fluid flow paths to prevent the loss of heat to the outside of the solar collector units.

The above mentioned prior art solar collector heat exchange units, which take on many different designs and structures are disclosed and described in U.S. Pat. Nos. 3,145,707, 3,555,756, 4,056,094, 4,182,308, 4,237,971, 4,245,620, 4,325,359, 5,431,149, 5,576,276, U.S. Publication No. 2004/0060555, and Great Britain Patent No. 2,099,134 to name just a few.

It is apparent that many of the prior art solar collector heat exchange units were designed and constructed to curtail manufacturing costs and time. Many attempted to economically fabricate by utilizing standard shapes and sizes of existing materials, eliminating the need for expensive machining or molding of materials, and eliminating complex installation procedures. However, these prior art solar collector units still lacks a cost effective way of mass producing, assembling and installation in a simple and cheap way in order to be economically attractive.

However, the disclosed invention is designed and constructed to provide a cost effective way of mass producing, assembling and installing in a simple and cheap way in order to be economically attractive and overcome the above cost and time issues. This will attract and allow more people throughout the United Sates and the World to utilize solar energy as an alternative energy source.

SUMMARY OF THE INVENTION

The present invention is designed and constructed to provide a very simple process to manufacture a relatively inexpensive and durable effective thermal solar collector cells and modules with a minimum use of required machinery and tools. Such low cost and easy method of fabricating materially contributes to a more efficient use and conservation of energy for all people throughout the world, especially those in underserved communities to go green. This low cost and easy method of fabricating would allow the solar collector cells to be ready for easy assembling by other solar module manufacturers, installers or other independent contractors. These solar cells can be utilized as off-the-shelf products in the development of new products or resources by other manufacturers of thermal solar collector modules.

Also, with more people being able to afford and use solar energy as an alternative green energy source, will automatically and materially enhance the quality of the environment by reducing greenhouse gas emissions.

In addition, the above low cost and easy method of fabricating with a minimum use of required machinery and tools contributes to the establishment of multiple fabrication facilities that will generate many green jobs and opportunities.

According to one aspect of the present invention a PYROPEG solar collector module embodying this invention comprises at least two heat exchanger solar cells with plural pipe tubing channels mounted on a specially designed aluminum frame or a galvanized two-part frame assembly, an insulating back material (polyurethane foam, polystyrene foam, styrofoam and other insulating types of material) with an optional metal back plate (galvanized, aluminum or stainless steel). A regular top cover (regular glass, tempered glass or polycarbonate sheet), glass hold down frame and screws, cell hold down clamps, frame assembling screws, and inlet and outlet cell fluid connectors. These solar module elements will be made available in a "kit", complete with all necessary components and easy to follow instructions. The potential user will be able to assemble the solar collector module with considerable ease, time and savings.

It is preferred that the dual solar cells have an overall preferred dimension of 32" in height, 47" in width and 2¼" in thickness. This size is important because any contractor may use regular construction supply material yielding minimum waste. The size is also easily handled by one person during installation.

The PYROPEG solar cells of the present invention comprises at least two elongated, generally rectangular heat absorbing thin metallic plates cut from a 4'×8' galvanized sheet metal with at least a thickness of 0.016". One of the at least two elongated, generally rectangular heat absorbing thin metallic plates includes an upper plate and a lower substantially flat plate. Then the upper plate is mounted on a 45 ton press and activated to imprint a serpentine or spiral-like special design of continuous plural corrugated sections defining alternating crest portions, valley portions and inclined portions extending between and connected to the crest and valley portions. Also, the 45 ton press folds an entire perimeter of the upper plate at a 90 degree angle and ½" height defining first peripheral edges. The other one of the at least two elongated, generally rectangular heat absorbing thin metallic plates includes a lower substantially flat plate.

Next, the upper plate is laid upside down or inside out and two holes are punched through the corrugated crest portions at a perimeter of the corrugated sections that is in close proximity to the ½" folds at opposite sides. One of the two holes then allows an inlet connector with a top portion to pass there through and a lower portion to be attached to one end of the flattened copper pipe tubing. The other one of the two holes then allows an outlet connector with a top portion to pass there through and a lower portion to be attached to the other end of the flattened copper pipe tubing.

Prior to the flattened copper tubing being inserted into the open channels and attached to the inlet and outlet connectors, a regular circular ½" copper tubing is placed in a bender apparatus where the circular ½" copper tubing is bent into a specified or spiral-like shape of three bends of 180 degrees and in sequential manner, where each bend is opposite to one another in direction and having a 3½" bend radius. After the circular ½" copper tubing is bent, it is then laid in an apparatus composed of two metal plates, whereby a pressure force (about 20,000 P.S.I.) is applied to the copper tubing and flattens it to a preferred thickness of ¼". Note that other sizes could be utilized, if desired, to one of ordinary skill in the art at the time the invention was made.

Next a hole is drilled in a top portion of the flattened copper tubing contiguous to both ends thereof. Then each of the ends of the flattened copper tubing is crimped closed and sealed by silver soldering. Other means for sealing the closed ends may be selected from the group consisting of brazing, welding and adhesive bonding. Thereafter, the flattened copper tubing is then positioned in the formed open channels and the inlet and out connectors is now passed through the two punched holes of the corrugated crest portions with the lower portions of the connectors being welded to the top of the flattened copper tubing above and in alignment with the holes at both ends thereof. However other types of securing means, such as mechanical fasteners, soldering and adhesive bonding, to name just a few, can be utilized by one of ordinary skill in the art, at the time the invention was made.

In a further aspect of the present invention, the flatten copper tubing is then positioned in the formed open channels with the upper plate being upside down and the lower plate is placed on the upside down upper plate over the flattened copper tubing, which closes the open channels. The upper plate has a dimension that is greater about its perimeter than a dimension of the lower plate about its perimeter so that the peripheral edges of the upper plate extends beyond the peripheral edges of the lower plate. Then the three parts, the upper plate, the flattened copper tubing and the lower plate are put together and mounted into a folding apparatus where the ½" folded peripheral edges of the upper plate can be folded over the peripheral edges of the lower plate for securing the upper and lower plates at their peripheral edges about their entire perimeters and compressing the flatten tubing between the upper and lower plates as a newly formed solar cell unit.

This newly formed solar cell unit is then mounted onto a pressing ram type apparatus for further pressing the folded peripheral edges of the upper plate and the peripheral edges of the lower plate with an even and uniform pressure force of about 80,000 P.S.I. that creates a first mating upstanding raised protuberance on an upper portion of the folded peripheral edge of the upper plate and a second upstanding raised protuberance on a portion of the folded peripheral edge of the lower plate, where the lower plate mating protuberance is forced into an underneath open surface of the raised protuberance of the upper plate. Also, the pressing die operation creates a third upstanding raised protuberance at the peripheral edge of the upper plate that folds over and underneath the peripheral edge of the lower plate. The above uniform pressure force is applied to ram pressing member where an upper male part and a lower female part of a die are mounted. When the upper male die part presses into the lower female die part it creates the first, second and third protuberances with a dimension of ¼" in width and ⅛" in height.

The third upstanding raised protuberance is forcibly crimped into an underneath open cavity of the second raised protuberance, while at the same time forcing the second protuberance into the open cavity of the first raised protuberance for rigidly securing the upper and the lower plates together as a single cell unit. To further secure the upper and lower plates together as a single unit, the end of the folded peripheral edge outward of the third raised protuberance is attached from the selected group consisting of welding, soldering and adhesive or epoxy bonding to an under surface of the lower plate inward of the second raised protuberance.

Note that the area between the upper and lower plates contiguous to the first second and third protuberances can also have a weld, solder, adhesive or epoxy means thereat for a further rigid securement. After this pressing operation the folded edges at all four pressed corners are soldered or epoxied to further add strength and rigidity to the single solar cell unit.

According to another aspect of the present invention, the upper plate includes a plurality of stamped dimple-like circular depressions or pin-less rivets along the valley portions and the lower plate includes a plurality of complimentary stamped dimple-like circular depressions or pin-less rivets for mechanically securing the upper and lower plates together as a single unit. The clinching operation is performed on the single cell unit after the last operation where the raised protuberances are formed on the upper and lower plates at their peripheral edges.

During the clinching operation, the pressed and formed single cell unit is then placed in a clincher machine where at least 16 circular depression like or pin-less like rivets that is at least ¼", will be impressed into the upper and lower plates in an even and uniform manner. Note that the valley portions have a dimension that is at least ¾". However, the dimensions of the valley portions and the circular depression like or pin-less like rivets can be of various sizes to one of ordinary skill in the art, at the time the invention was made.

These pin-less or circular depression like rivets will effectively secure the upper and lower plates and conform them into a single body unit, which forms a continuous channel there between for encloses the flattened copper tubing therein. The enclosed flattened copper tubing lies in a uniform contact relationship with the upper and lower plates by pressure from the at least 16 pin-less or circular depression like rivets and the raised protuberances of the folded peripheral edges of the upper and lower plates. The solar cells are spray painted with a non-reflective black paint. This process assists the already galvanized unit in protecting itself from the environmental elements.

The clinching operation completes the mechanical operation of the now formed single cell unit by adding to it additional stiffness and rigidity.

Thereafter, 45 degree angular inlet and outlet copper tubing members are then soldered to each inlet and outlet connectors to complete the fabrication of the single solar cell unit.

Once the single solar cell unit is to be utilized as a dual module of the preferred embodiment of the present invention can now be created with the following components. A specially shaped design extruded aluminum frame of a specified length comprising four pre-cut aluminum frame pieces with at least three (3) screw channels formed along an interior surface and extending to the corner edges thereof. The at least three (3) screw channels extend substantially along all of the frame pieces at upper, intermediate and lower locations thereon. Each corner edge of all of the frame pieces have at least three (3) drilled screw holes therein that will align with the at least three (3) screw channels. This will allow screws to be inserted through screw holes at the four corner edges of frame pieces and into the screw channels to secure the four-piece frame pieces together to define a dual solar cell module frame housing unit.

The at least a pair of the frame pieces further includes an at least three (3) supporting ledges, an upper ledge at an upper section that includes the screw hole, an intermediate ledge at an intermediate section thereon and a base, foot or bottom ledge projected inward at a lower end thereof. and the intermediate ledge is shorter than the base or bottom ledge. This permits other solar cell module elements to be inserted therein without interfering with each other.

The upper screw channel is formed on an undersurface of the upper ledge adjacent an end thereof, the intermediate screw channel is formed on and extend from an interior surface of the at least a pair of the frame pieces contiguous to and above the intermediate ledge and the lower screw channel is formed on an interior upper surface of the bottom ledge, which is spaced at a location close to but spaced from the end thereof. Note that the intermediate screw channel has a threefold purpose, the first being to receive securing screws through the corner screw holes to secure the frame pieces about at least a pair of single solar cell units, the second being the utilization only of the intermediate screw channel solely for holding the frame when assembling them together and third, the intermediate screw channel is used as rest support for the single solar cell unit peripheral edges.

Further, the preferred dual solar collector module includes a pair of single solar cell units within the dual solar cell module frame housing unit. An opening is drilled through the crest portion near a crimped silver soldered closed end of the flattened copper tubing member to receives the inlet and out connectors there through by soldering or welding or brazing to a top portion of the flattened copper tubing member over a hole formed in the flattened copper tubing member adjacent the crimped closed end to allow fluid medium to pass between the fluid inlet and outlet connectors to heat utilization device. Also, the module frame housing unit further includes back support plates (for the dual solar cell units) that rests on the bottom ledge for supporting and receiving an insulation material, such as Styrofoam, thereon, which extends outward in close proximity to the screw channel on the bottom ledge.

Additionally, the corrugated upper plate with the inclined or angled portions, the top crest portions, the lower plate and a first inward portion of the folded and overlapped peripheral edge is positioned to rest on the insulation material. A second outward portion of the peripheral edge rests on the intermediate ledge and spaced from the intermediate screw channel. The dual solar cell unit defined by the upper plate with the inclined or angled portion, the top crest portions, the lower plate and the folded and overlapped peripheral edge is clamped down within the dual solar cell module frame housing unit by a plurality of hold-down clamps by screws and washers. The screws are screwed through the hold-down clamps and through screw holes in the intermediate ledge to compress the peripheral edges between the intermediate ledges and the hold-down clamps for adjusting compression force thereto.

Also, this adjustable compression force will simultaneously press the above defined dual solar cell units into abutting engagement with the insulation materials. A screw head of hold down screw rests upon the hold down washers that rests upon an upper surface of the hold-down clamps. Also, the hold-down clamps have a first end that rests upon the intermediate screw channel member and a second end that rests upon the peripheral edges.

The upper ledge serves as a rest member for supporting a cover glass thereon. The cover glass is at least ⅛" in thickness and is held in place by at least a preformed one-piece 90 degree aluminum angular molding having a thickness that is at least 0.070". In addition, the cover glass has a back cover that can be made from either galvanized or aluminum sheet metal or a composite material, if desired. The upper ledge has a sealing caulking paste or compound that is applied thereto, so that the cover glass will be secured and made weather resistant by the combination of the sealing caulking paste or compound and the downward pressure applied to the four frame pieces and the at least one-piece 90 degree angular molding. This at least one-piece 90 degree angular molding includes an upper rim portion that engages and extends along an upper surface of a peripheral end portion of the cover glass and a downward perpendicular leg portion of the at least one-piece 90 degree angular molding that projects around the upper portion of the upper part of the frame pieces. The at least one-piece 90 degree angular molding is secured to the upper portion of the upper part of the frame pieces by at least 8 sheet metal screws that extend through drilled holes in the at least one-piece 90 degree angular molding and through the screw holes of the frame pieces at a lateral side thereof to tightly secure the cover glass against the ledges of the frame pieces. Note that the sheet metal screws are disposed at a spaced distance below the upper screw channel to obviate any interference therewith.

Finally, the dual module frame pieces are wire brushed to a polished finish. Then the inlet and outlet connectors are capped at the end portions of each of the 45 degree angular copper tubing opposite the end that is soldered, brazed or welded to the inlet and outlet connectors. A flexible hose or tube having one end connected to the outlet connector of a first one of the pair of single solar cell units and the other end is connected to the inlet connector of the second one of the pair of the single solar cell units. Optionally, a pair of hose clamps can be used to clamp each end of the flexible hose to provide a fluid-tight seal on each of the 45 degree angular copper tubing. Now the dual solar cell module unit is now ready for shipment.

These and other features, aspects and advantages of the present will become better understood with regard to the following description, appended claims and accompanying drawings.

BRIEF DESCRIPTION OF THE DRAWINGS

The present invention may be better understood, along with its numerous objects, features, and advantages made apparent to those skilled in the art by referencing the accompanying drawings.

DETAILED DESCRIPTION

Reference will now be made in detail to the preferred embodiments of the invention, examples of which are illustrated in the accompanying drawings. While the invention will be described in conjunction with the accompanying drawings, it will be understood that they are not intended to limit the invention to the accompanying drawings. On the contrary, the present invention is intended to cover alternatives, modifications and equivalents, which may be included within the spirit and scope of the invention as defined by the appended claims.

Figure 1:
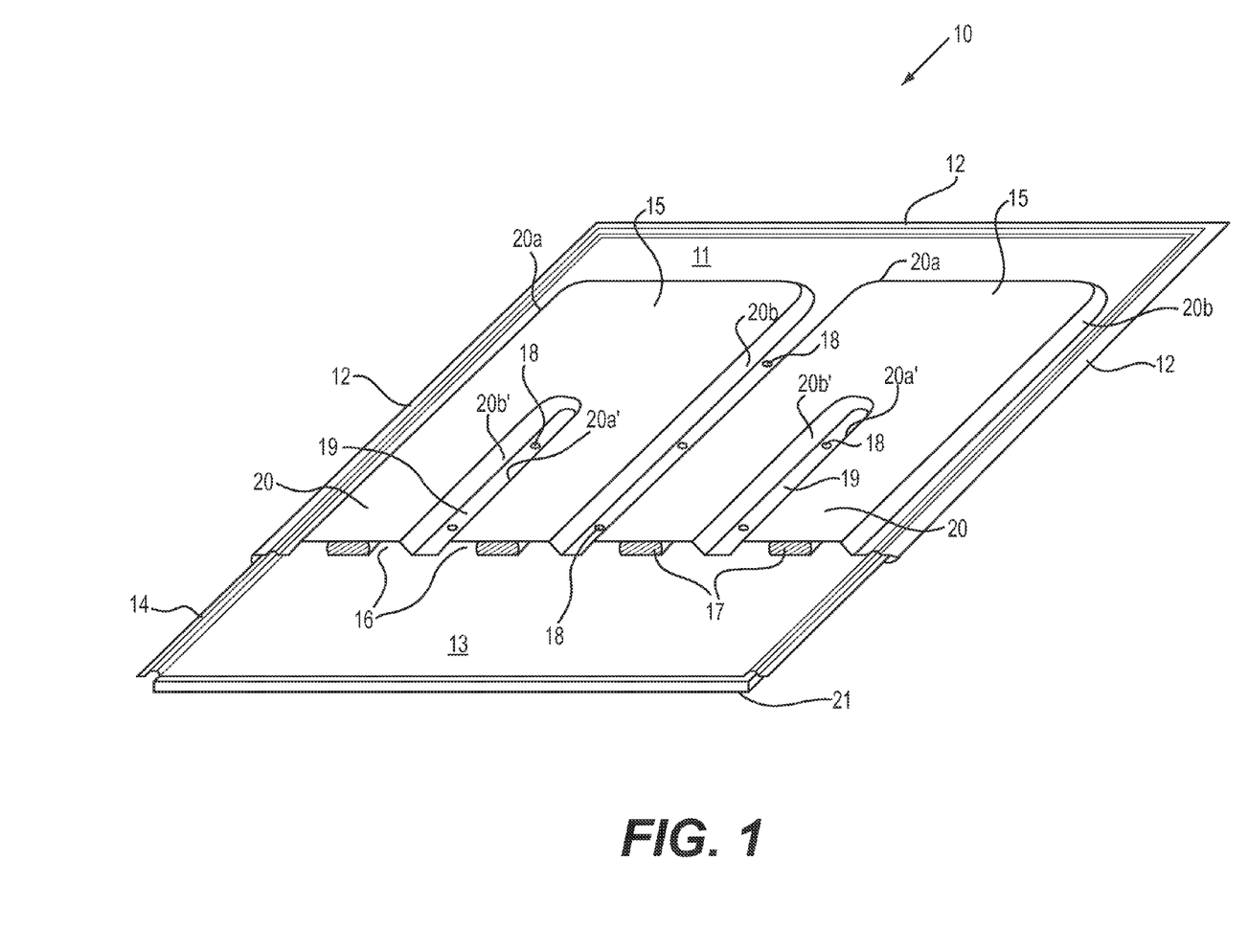
FIG. 1 illustrates an isometric view of a solar cell device according to the present invention.

FIG. 1 of the present invention shows an isometric cut-out view of an improved formed solar cell unit device 10 comprising an upper sheet metal plate 11 and a lower sheet metal plate 13, preferably of extruded aluminum, with a flattened copper tubing 17 disposed and secured there between. It is hereby acknowledged that the metal plates 11 and 13 can be made out various other types of metals, if desired. The upper plate 11 and the lower plate 13 are cut from 4'×8' galvanized sheet metal having a thickness of 0.020" with the upper plate 11 being wider by at least ½" over the entire perimeter than lower plate 13. This wider perimeter defines a peripheral edge 12 around the entire fold of the upper plate 11 and being able to be folded over the outer perimeter portion of lower plate 13 defining a peripheral edge securing means 12 and 14. The peripheral edge securing means 12 and 14 will be discussed in greater details below. Upper plate 11 has a stamped continuous corrugated design thereon.

This corrugated design is formed by mounting the upper plate 11 on a 45 ton die press apparatus for imprinting or impressing a continuous form of plural alternating upstanding crest portions 15, valley portions 19 and inclined or angled connecting portions 20a, 20a', 20b and 20b' on an upper surface when activated. Further, the alternating crest portions 15 and valley portions 19 creates a continuous form of channels or cavities 16 on an under surface thereof. The undersurface channels or cavities 16 are connected in a continuous form by the inclined and connecting portions 20a, 20a', 20b and 20b'. The plural alternating upstanding crest portions 15 and the undersurface channels or cavities 16 forms a continuous serpentine or spiral-like shape for receiving the flattened copper tubing 17 with a pair of inlet and outlet closed end portions (not shown). These closed ends are crimped and silver soldered to seal the crimped closed ends. A drilled hole is made adjacent the perimeter of the closed end portions.

Figure 7:
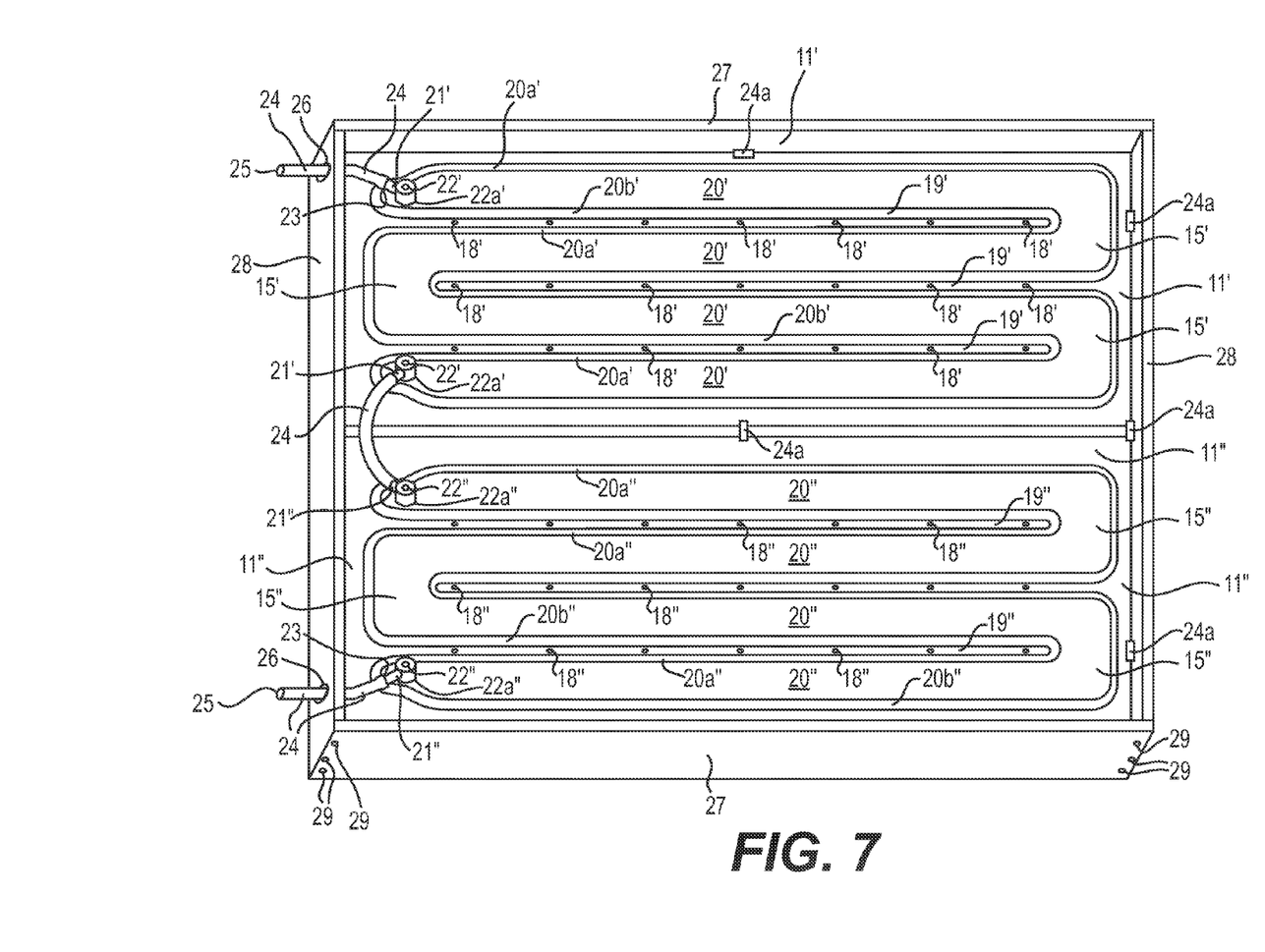
FIG. 7 illustrates an isometric top view of the solar cell device as a dual module unit according to the present invention.
Figure 8:
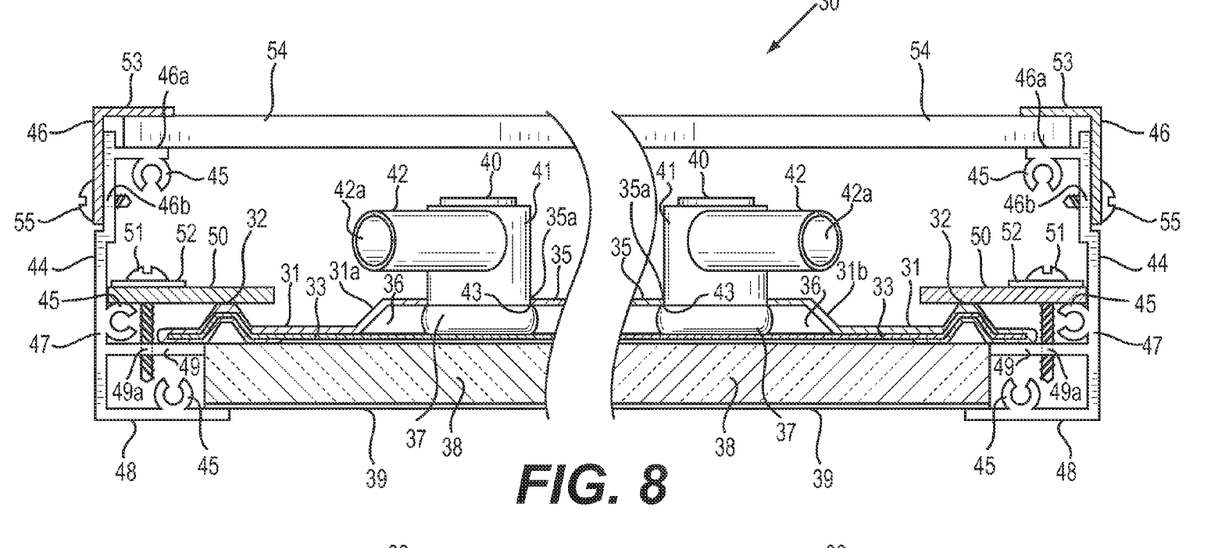
FIG. 8 illustrates a front view of a preferred solar cell module unit with inlet and outlet connectors, glass cover, insulation, back plate, solar cell unit with clamping means for the peripheral folded and overlapping edge and a module frame with a plurality of screw channels there through for securing the frame together and screw clamps for holding down the glass cover according to the present invention.

Preferably, these drilled holes are positioned at least a ¼" from the crimped closed ends and have a dimension that is at least a ¼". Note that various other sizes of the drilled holes and distances can be utilized, if desired. The upper plate 11 is laid inside out and two holes 22a and 22a" in FIG. 4, two holes 22a' and 22a" in (FIG. 7) and two holes 35a in FIG. 8 are punched there through near the perimeter of the upper plate 11 to allow inlet and outlet connectors 21 and 22 shown in FIG. 4, inlet and outlet connectors 21', 21", 22' and 22" shown in FIG. 7 and inlet and outlet connectors 40, 41 and 42 shown in FIG. 8 to be inserted there through and attached to the inlet and outlet closed end portions over and in alignment with the drilled holes (not shown) of the flattened copper tubing 17. This allows fluid to be transferred between the inlet and outlet connectors 21 and 22 of FIG. 4, the inlet and outlet connectors 21', 21", 22' and 22" of FIG. 7 and the inlet and outlet connectors 40, 41 and 42 of FIG. 8 in a heat transfer relationship.

Additionally, the plural alternating upstanding crest portions 15 has a pair of outside and inside inclined or angled portions 20a and 20b with an intermediate valley portion 19 interconnecting the inside angled portions 20a and 20b that extends substantially along the entire length of the crest portions 15. Also, the crest portions 15 define alternating crest leg elements 20 of a shorter length dimension than the overall length of the upstanding crest portions 15. Such alternating leg elements 20 forms a U-shape like portion of the continuous serpentine or spiral-like shape with a pair of inside inclined or angled portions 20a' and 20b' that corresponds to the length dimension of the alternating crest leg elements 20. Each of the alternating inside inclined or angled portions 20a' and 20b' is interconnected by a shorter valley portion 19, which corresponds to the length dimensions of the inclined or angled connecting portions 20a' and 20b' and the shorter alternating crest leg elements 20, which set forth the U-shape portion of the continuous spiral shape that conforms to the shape of the flattened tubing disposed in the undersurface channels or cavities 16.

Also, the 45 ton press folds an entire perimeter of the upper plate. The other one of the at least two elongated, generally rectangular heat absorbing thin metallic plates includes a lower substantially flat plate. Then the lower plate is mounted on a press (die) that folds and entire perimeter of the lower plate at a preferred 90 degree angle and ½" height defining second peripheral edges.

Figure 4:
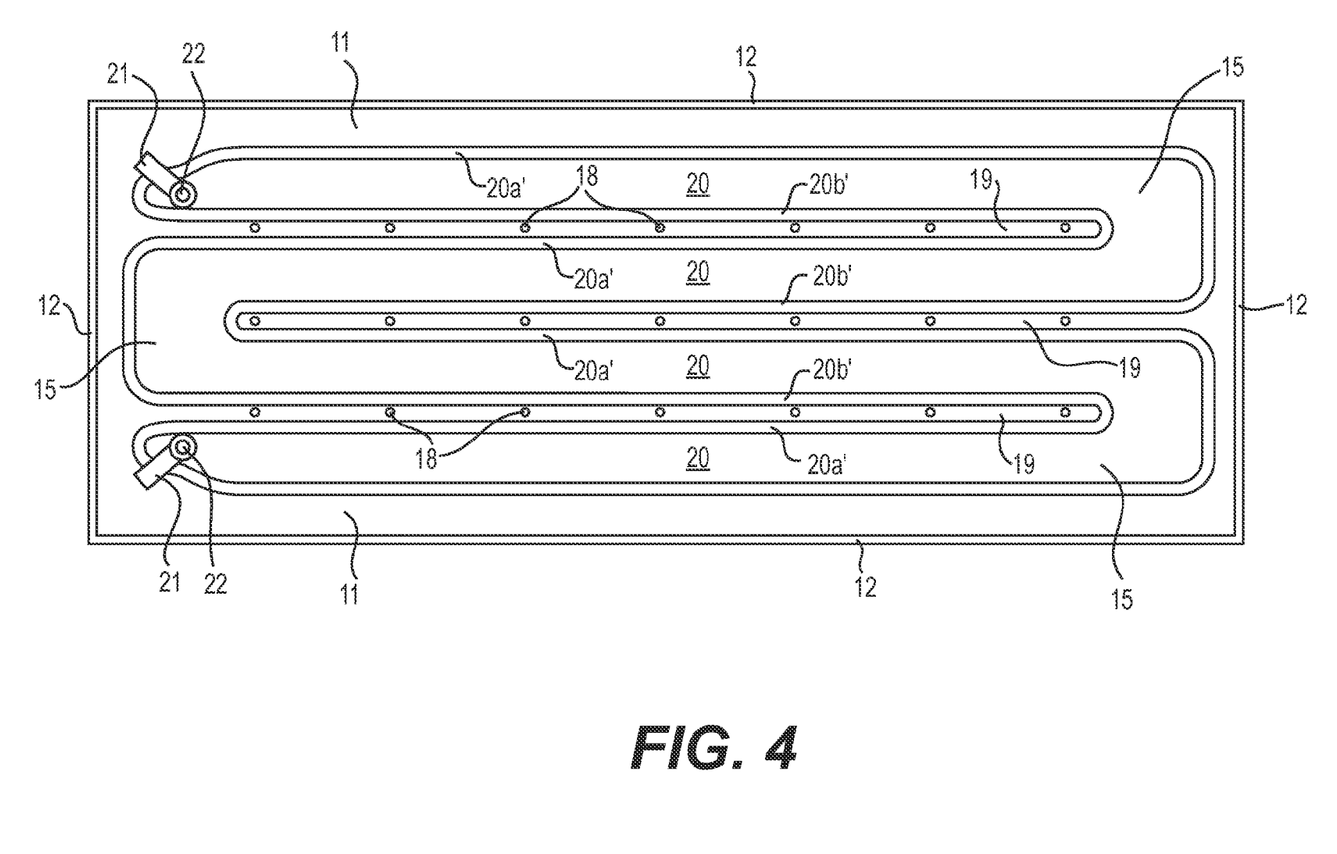
FIG. 4 illustrates a top view of the solar cell device according to the present invention.

Also in FIG. 1, when the 45 ton press die apparatus is activated, it will fold an entire perimeter of the wider peripheral edge 12 of the upper plate at a 90 degree angle and ½" height defining first peripheral edges for rigidity and stiffness. After this folding operation, the flattened copper tubing is positioned in the formed channels or cavities in an upside down position and the inlet and outlet connectors 21 and 22 as shown in FIG. 4, inlet and outlet connectors 21', 21", 22' and 22" as shown in FIG. 7 and the inlet and outlet connectors 40, 41 and 42 as shown in FIG. 8 are inserted through the punched holes 22a (FIG. 4), 22a' and 22a" (FIG. 7) and 35a (FIG. 8) and welded to the top of the flattened copper tubing 17 (FIGS. 1-3) and the flattened copper tubing 37 (FIG. 8) over the drilled holes (not shown) of the flattened copper tubing 17. Then the flattened copper tubing 17 that is now disposed within the channels or cavities 16 is sandwiched between the upper plate 11 and the lower plate 13 to attach the upper plate 11 and lower plate 13 together by mounting them into a folding apparatus where the ½" folded peripheral edges 12 are folded over the peripheral edges 14 to form a single solar cell unit 10.

After the single solar cell unit has been formed, this newly formed solar cell unit 10 is then mounted on to another pressing die apparatus that presses the upper plate 11 and lower plate 13 peripheral edges 12 and 14 with an even and uniform pressure of about 80,000 P.S.I. This pressure is applied by a ram device where a male part of a die is mounted, so that when the male part of the die presses into a female part of the die, it forms a protuberance of about ¼" in width and ⅛" in height. After this operation, the folded and pressed corner edges 12-12e (FIG. 6) defined by the wider peripheral edge 12 of the upper plate and the pressed corner edges 14-14c (FIG. 6) defined by peripheral edge 14 of the lower plate 13 are then welded or soldered there between and at element 14d to establish a strong rigid and stiff connection around the entire perimeter of the newly formed solar cell unit 10.

Next, the pressed and newly formed solar cell unit 10 is taken to a clincher machine where at least 16 circular depression like or pin-less like rivets 18, 18' and 18" are impressed along the valleys 19, 19' and 19" of the upper plate 11 and a corresponding aligned surface of the lower plate 13 with a dimension of ¾" that will bring about a uniform clinching contact that will cause the upper plate 11 and the lower 13 to engage the flattened copper tubing 17 and 37 in a sandwich relationship. This will make the upper plate 11, the lower plate 13 and the flattened copper tubing 17 and 37 an improved and complete single solar cell unit 10. This clinching apparatus has a specially designed die that is able to fastened and press together the upper plate 11 and the lower 13 by forming the pin-less rivets 18, 18' and 18" as dimple-like depressions along the valleys 19, 19' and 19" of the upper plate 11 and the corresponding aligned surface of the lower plate 13. Now, this operation completes the mechanical operation of the pressed and newly formed solar cell unit 10 by adding to it additional stiffness and rigidity to render a strong and unified final product. Then, inlet and outlet tubes 24 (FIG. 7) are then connected to the inlet and outlet connectors 21 and 22 as shown in FIG. 4, inlet and outlet connectors 21', 21", 22' and 22" as shown in FIG. 7 and the inlet and outlet connectors 40, 41 and 42 (FIG. 8) to complete the fabrication of the newly formed solar cell unit 10.

Figure 2:
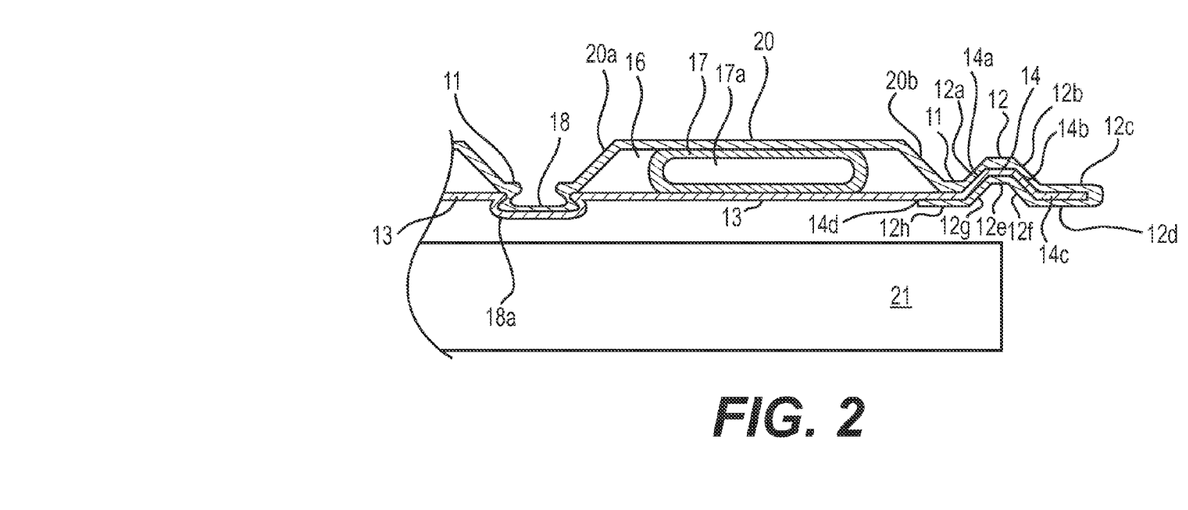
FIG. 2 illustrates a front cut sectional view of the solar cell device according to the present invention. This view shows details of the peripheral folded and overlapping edge and the pin-less or depression-like rivets

FIG. 2 is a cut front sectional exploded view that shows the dimple-like depressions 18 along the valley portions 19 (not shown, see FIG. 1) in the upper plate 11 and the corresponding aligned dimple-like depression 18a in a surface portion of the lower plate 13 created by the aforementioned pressing operation. Extending to the right of the dimple-like depressions 18 and 18a as shown is one of the alternating crest portions 20 with the inclined or angled portions 20a extending there from and the inclined or angled portion 20b of the one alternating crest portion 20 interconnects a first periphery edge raised protuberance 12 of the upper plate 11. The first periphery edge raised protuberance 12 includes a pair angled or inclined leg portions 12a and 12b, with angled leg portion 12a being connected to the alternating crest portion inclined portion 20b and the angled leg portion 12b being connected to an upper overlapping portion 12c and a lower overlapping portion 12d. Extending inward of the lower overlapping portion 12d is a third raised protuberance 12e, with angled leg portion 12f being connected to the lower overlapping portion 12d and the angled leg portion 12g being connected to an outward extending overlapping edge end portion 12h, which is welded to an undersurface of the lower plate 13.

Lower plate 13 has a second periphery edge raised protuberance 14 disposed and nested between the first raised protuberance 12 and the third raised protuberance 12e of the upper plate 11. Note that the second periphery edge raised protuberance 14 includes a pair of angled or inclined leg portions 14a and 14b, with the angled leg portions 14a and 14b being pressed into an abutting engagement with mating surfaces of the cavity of the first raised protuberance 12, with the lower surface of the lower plate 13 inward of the raised protuberances 12, 12e and 14 being pressed across and against the plural open channels or cavities 16 of the plural alternating crest portions 20 for enclosing the flattened copper tubing 17 therein.

To rigidly secure the upper plate 11 and lower plate 13 together as a single cell unit, the third upstanding raised protuberance 12e is forcibly crimped or pressed into an underneath open cavity formed by the second raised protuberance 14 and the pair of angled or inclined leg portions 14a and 14b, while at the same time forcing the pair of angled or inclined leg portions 12f and 12g into an abutting engagement with mating surfaces within the open cavity of the second raised protuberance 14.

An insulation material 21, such as Styrofoam, is disposed below the lower plate 13 as shown. However, the insulation material 21 is in an engaging relationship with the lower plate 13 when the upper plate 11 and lower plate 13 are secured together as a single cell unit as previously discussed.

Figure 3:
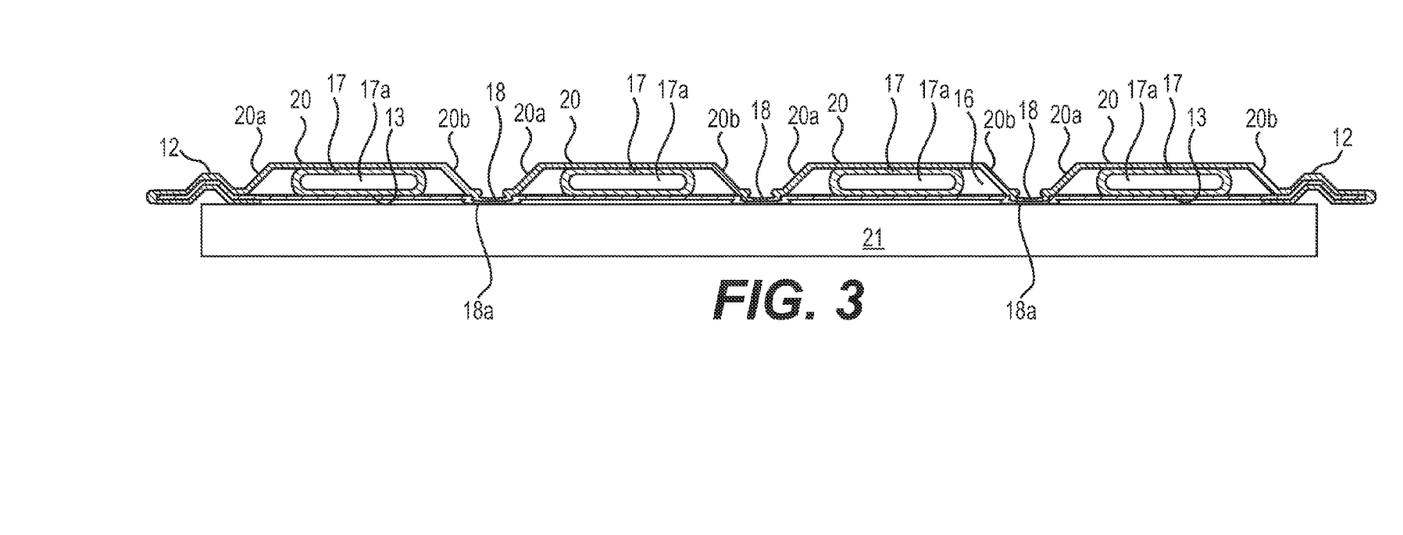
FIG. 3 illustrates a full front view of the solar cell device according to the present invention.

FIG. 3 is a full cut front view of the cut sectional exploded view illustrated in FIG. 2 with the upper plate 11 including a plurality of alternating crest portions 20 with the dimple-like depressions 18 along the valley portions 19 (not shown, see FIG. 1) disposed there between and mating with the corresponding aligned dimple-like depression 18a in a surface portion of the lower plate 13. The plurality of dimple-like depressions 18 are alternately joined to the inclined or angled portions 20a extending from one side thereof to an alternating crest portion 20 and the inclined or angled portion 20b extending from the other side thereof to another alternating crest portion 20. The outer inclined or angled portions 20a and 20b adjacent the perimeter interconnects with the periphery edge raised protuberances 12 of the folded and overlapping edges of the upper plate 11 at opposite sides. Details of the folded periphery edge and raised protuberances 12 have been previously recited in the description of FIG. 2 above. Note that the flattened copper tubing 17 is shown sandwiched between the upper inside surface of the upper plate 11 and the inside surface of the lower plate 11. This sandwich relationship holds the flattened copper tubing 17 within the channels or cavities 16 in a tight engagement therein to prevent movement of the copper tubing 17.

Also in FIG. 3, an insulation material 21, such as Styrofoam, is disposed below the lower plate 13 as shown. The insulation material 21 is shown in an engaging relationship with the lower plate 13 when the upper plate 11 and lower plate 13 are secured together as a single cell unit as previously discussed.

The illustration shown in FIG. 4 represents a top view of the solar cell unit 10. This figure shows the periphery edges 12, the plural imprinted or impressed continuous form of plural alternating upstanding crest portions 15 and 20, dimple-like depressions or pin-less rivets 18, valley portions 19 that receives the impressed dimple-like depressions or pin-less rivets 18 and the inclined or angled connecting portions 20a, 20a', 20b and 20b' on an upper surface that extends from alternating sides of the crest portions 15 and 20. Further, the alternating crest portions 15 and 20 and valley portions 19 creates a continuous form of channels or cavities 16 on an under surface thereof (not shown, see FIGS. 1-3).

The undersurface channels or cavities 16 (not shown) are connected in a continuous form by the inclined and connecting portions 20a, 20a', 20b and 20b'. The plural alternating upstanding crest portions 15 and 20 and the undersurface channels or cavities 16 (not shown) forms a continuous spiral shape for receiving the flattened copper tubing 17 not shown) with a pair of inlet and outlet holes The upper plate 11 is laid inside out and two holes (not shown) are punched there through near the perimeter to allow the similar inlet connector 21 and 22 and outlet connector 21 and 22 to be inserted there through and attached to an upper surface of the flattened copper tubing 17 (not shown) by welding, soldering or brazing. Note that a hole (not shown) is drilled through a top surface of the flattened copper tubing 17 that is positioned at least a ¼" from a crimped end thereof that is silver soldered or brazed closed. To one of ordinary skill in the art, at the time the invention was made, the hole can be positioned at other distances from the closed crimped end of the flattened copper tubing 17, if desired.

Figure 5:
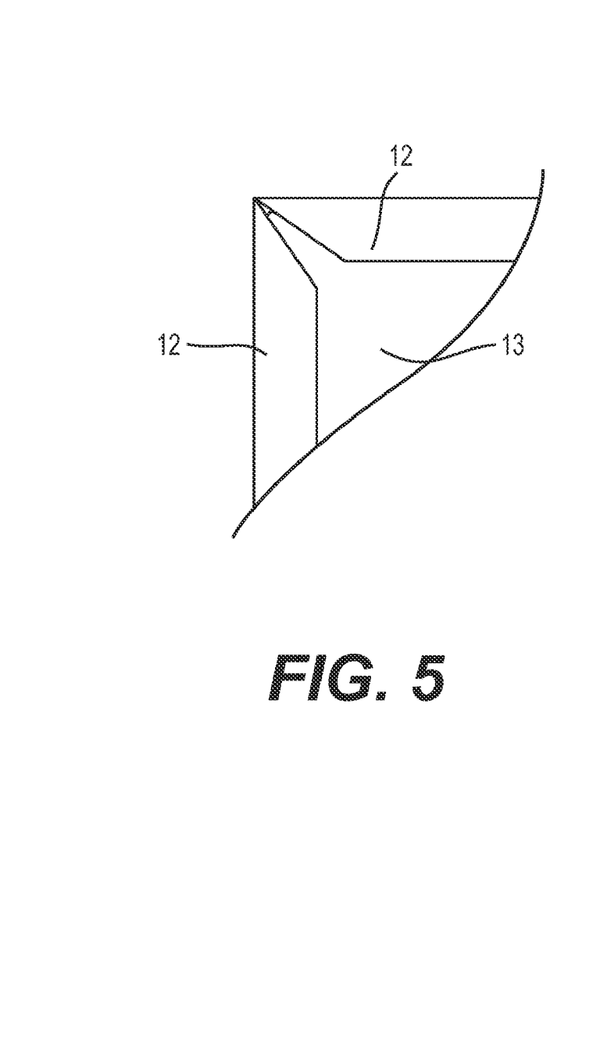
FIG. 5 illustrates a cutaway isometric view of the solar cell device's corner and folded peripheral edge being open according to the present invention.

FIG. 5 shows a cutaway isometric view of the folded and overlapping peripheral edge 12 corner of the upper plate 11 that is disposed in a slight spaced position from the bottom of lower plate 13 of the solar cell unit 10, prior to the corner edges of the upper plate 11 and the lower plate 13 being pressed down and welded, soldered, brazed or epoxied together.

Figure 6:
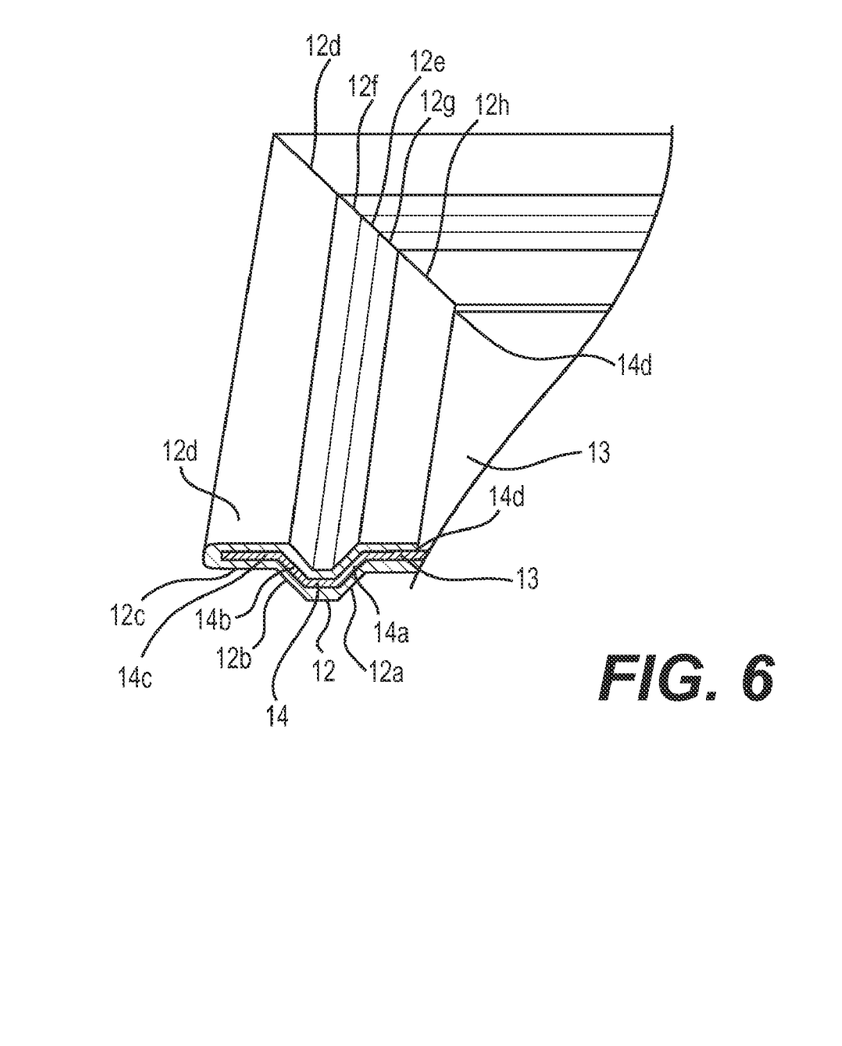
FIG. 6 illustrates a cutaway 3-D isometric view of the solar cell device's pressed and soldered corner and folded peripheral edge according to the present invention.

FIG. 6 illustrates a cutaway 3-D isometric view of the pressed and soldered corner and folded and overlapping peripheral edge 12 seen from the bottom of lower plate 13 of the solar cell unit 10. This view shows similar peripheral edge reference numbers as shown in FIG. 2. Note that FIG. 6 shows a bottom oriented isometric 3-D affect and FIG. 2 shows a front cut oriented view. The description of FIG. 6 will be discussed in a similar manner as previously discussed in FIG. 2 above, since it is merely turned upside down.

Looking from the bottom of the lower plate 13, the first periphery edge raised protuberance 12 includes a pair of angled or inclined leg portions 12a and 12b, with angled leg portion 12a that is connected to the alternating crest portion inclined portions 20a and 20b (not shown) and the angled leg portion 12b being connected to an upper overlapping portion 12c and a lower overlapping portion 12d. Extending inward of the lower overlapping portion 12d is a third raised protuberance 12e, with angled leg portion 12f being connected to the lower overlapping portion 12d and the angled leg portion 12g being connected to an outward extending overlapping edge end portion 12h, which is welded, brazed or soldered to an undersurface of the lower plate 13.

Lower plate 13 has a second periphery edge raised protuberance 14 disposed and nested between the first raised protuberance 12 and the third raised protuberance 12e of the upper plate 11. Note that the second periphery edge raised protuberance 14 includes a pair of angled or inclined leg portions 14a and 14b, with the angled leg portions 14a and 14b being pressed into an abutting engagement with mating surfaces of the cavity of the first raised protuberance 12, with the lower surface of the lower plate 13 inward of the raised protuberances 12, 12e and 14 being pressed across and against the plural open channels or cavities 16 (not shown) of the plural alternating crest portions 20 (not shown) for enclosing the flattened copper tubing 17 (not shown) therein. To rigidly secure the upper plate 11 and lower plate 13 together as a single cell unit, the third upstanding raised protuberance 12e is forcibly crimped or pressed into an underneath open cavity formed by the second raised protuberance 14 and the pair of angled or inclined leg portions 14a and 14b, while at the same time forcing the pair of angled or inclined leg portions 12f and 12g into an abutting engagement with mating surfaces within the open cavity of the second raised protuberance 14.

The four corner edges defined by the raised protuberances 12, 12e and 14, inclined or angled leg portions 12a, 12b, 12f, 12g, 14a and 14b and the under surface overlapping outward and inward edge portions 12d and 12h are pressed and welded, soldered, brazed or epoxied there between to further add strength and rigidity to the formed solar cell unit 10. Also, 12h is welded, soldered or brazed to the lower plate 13 at 14d to further strengthen the peripheral edge 12 and the solar cell unit 10. If desired, other types of securing means could be utilized, such as, adhesives or other types of bonding means.

As illustrated in FIG. 7, an isometric top view of the solar cell device as a dual module unit that includes a pair of formed solar cell units 11' and 11". These units are identical to solar cell unit 10 in FIGS. 1-6 and the reference numerals are identical except that they have a 'and" added to them. This dual module arrangement further includes a four-piece extruded aluminum frame 27 and 28, 3 copper tube members 24 bent at an angle of 45 degrees, a pair of corner openings 26 disposed within one of the frame pieces 27 or 28 to allow one end of the copper tube members to pass there through, at least a pair of 3 frame securing screw through channels, and a plurality of frame and solar unit hold-down clamping members 24a.

It is preferred that the dual solar cell units have an overall dimension of 32" in height, 47" in width and 2¼" in thickness. This size is important because any contractor may use regular construction supply material yielding minimum waste. The size is also easily handled by one person during installation.

The four-piece frame 27 and 28 is assembled around the pair of solar cell units 11' and 11". A pair of frame pieces 27 is positioned perpendicular to a pair of frame pieces 28 forming an enclosed structure. At least one of the pair of frame pieces 27 or 28 has at least three substantially spaced-apart screw through channels therein that receives complimentary screws for securing the frame pieces 27 and 28 together as a housing unit. For example, the at least three spaced-apart screw channels are disposed along an interior surface of at least one of the pair of frame pieces 27 or 28 that extends substantially along its entire length. These screw channels are in alignment with the screws 29 as shown in FIG. 7 for holding the frame pieces 27 and 28 together. Note that FIG. 7 depicts the screws 29 being positioned along the corner ends of frame pieces 27, so that the screws 29 can be inserted on opposite corners of both frames 27 through the spaced-apart screw channels that would be disposed along an interior surface of frame pieces 28.

The middle screw channel has a three-fold purpose, which will be discussed later during the description of FIG. 8 below. With this being said the four piece frame 27 and 28 is assembled by the top, middle and bottom screws 29 at each joining corner (12 total screws).

Prior to securing the four piece frame around the dual solar cell units 11' and 11", a 45 degree angled copper tube member 24 having one end 23 soldered to the inlet and outlet connectors 21', 22' and 21" and 22" with the other end 25 being inserted through the corner openings 26 in one of the frames 28 at the corner ends as illustrated in FIG. 7. The assumption is that the top connectors 21' and 22' that cooperate with opening 26 is labeled as the inlet connector attached to a fluid medium source and the bottom connectors 21' and 22" of solar cell unit 11' is labeled as the outlet connector.

Then another 45 degree angled member 24 is disposed between the dual solar cell units 11' and 11" and soldered at both ends 23 with one end of 23 being connected to the outlet connector 21' and 22' of solar cell unit 11' with the other end 23 being connected to the inlet connector 22" of solar cell unit 11" and the bottom connector 22" of solar cell unit 11" that is associated with opening 26 is labeled as the outlet connector and connected to a heat utilization device (not shown). If desired, this arrangement can be reversed and the above inlet and outlet connectors will be just the opposite.

In FIG. 7, the peripheral folded and overlapped edges 12 as shown in FIGS. 1-4 have at least three spaced-apart hold-down clamps 24a on the front and back sides of the frame elements 28 of the dual solar cell units 11' and 11" for clamping down the dual solar cell units 11' and 11" within the module housing unit defined by frame members 27 and 28. Note that the at least three spaced-apart hold-down clamps 24a on the front side are not shown. Additionally, at least a single hold-down clamp 24a is disposed at an intermediate location for clamping down the peripheral folded and overlapped edges 12 relative to the sides defined by frame members 27 and at an intermediate location along the adjacent interior sides of the solar cell units 11' and 11" within the module housing unit defined by the frame members 27 and 28.

Referring now to FIG. 8, a complete module of the preferred embodiment of the dual solar cell module as shown in FIG. 7, which shows a specially shaped design extruded aluminum frame of a specified length comprising four-piece pre-cut aluminum frame members 44 with at least three (3) screw channels 45 formed along an interior surface adjacent the corner edges thereof. For example, the at least three (3) screw channels 45 are formed substantially along the entire length of all of the four-piece frame members 44 (similar to elements 27 and 28 of FIG. 7) at upper, intermediate and lower locations thereon. Note that each corner edge of all of the frame members 44 (not shown, but similar to elements 27 and 28 of FIG. 7) have at least three (3) drilled screw holes 29 therein as shown in FIG. 7 that will align with the at least three (3) screw channels 45.

This will allow screws (not shown) to be inserted through screw holes 29 at the four corner edges of the frame members 44 and into the screw channels 45 to secure the four-piece frame members 44 together to define the dual solar cell module housing unit 30. All of the specially designed frame members 44 further includes at least three (3) supporting ledges, an upper ledge 46a at an upper section that includes the screw hole 46b, an intermediate ledge 49 at an intermediate section 47 and a base, foot or bottom ledge 48 projected inward from an interior surface thereof. These ledges 46a, 48 and 49 are designed such that the upper ledge 46a is shorter than the intermediate ledge 49 and the intermediate ledge is shorter than the base or bottom ledge 48. This allows other solar cell module elements to be placed therein without experiencing interference with other elements.

As shown in FIG. 8, the upper screw channel 45 is formed on an undersurface of ledge 46a adjacent an end thereof, the intermediate screw channel 45 is formed on and extend from an interior surface of the front and back frame members 44 contiguous to and above the intermediate ledge 49 and the lower screw channel 45 is formed on an interior upper surface of the bottom ledge 48, which is spaced at a location close to but spaced from the end thereof. As previously mentioned, the intermediate screw channel 45 has a three-fold purpose, the first being to receive securing screws through corner screw holes 29 (FIG. 7) to secure the frame about the single solar cell unit 11', 11" and 30, the second being the utilization only of the screw channel 45 for holding the frame members 44 together when assembling them and third, the screw channel 45 is used as rest support for the single solar cell unit peripheral edges 12 and 32.

Further in accordance to FIG. 8, solar module housing unit 30 is represented by a cut sectional front side view of dual solar cell units 11' and 11", but is represented by different reference numerals, which will now be described in greater details. The solar cell units 11' and 11" is represented by a corrugated upper plate 31 with inclined or angled portions 31a and 31b, a top crest portion 35 with a peripheral edge of a specified dimension, a lower plate 33 with a peripheral edge that is less than the dimension of the upper plate member 31a to allow the peripheral edge of the upper plate 31 to be crimped and folded over the peripheral edge of the lower plate 33 to provide rigidity and strength to the solar cell units 11' and 11", an opening 35a that is drilled through the crest portion 35 near the crimped silver soldered closed end (not shown) of the flattened copper tubing member 37 that receives the inlet and out connectors 40, 41, 42 and 42a there through and soldered or welded or brazed to a top portion of the flattened copper tubing member 37 over a hole (not shown) formed in the flattened copper tubing member 37 adjacent the crimped closed end to allow the fluid medium to pass between the fluid inlet and outlet connectors 40,41, 42 and 42a. Element 42a is an opening within the angled copper tubing 42 that receives the fluid medium through the flattened copper tubing member 37 on the left side and discharges heat exchanged fluid from the flattened copper tubing member 37 on the right side as illustrated in FIG. 8.

As shown, the flattened copper tubing 37, which takes on a spiral shape is received in a spiral like cavity or channel 36 defined in an undersurface of the crest portion 35. Also, the module housing unit 30 further includes back support plates 39 (for the solar cell units 11' and 11") that is supported on the bottom ledge 48 that supports and receive an insulation material 38, such as Styrofoam, thereon, which extends outward in close proximity to the screw channel 45 on the bottom ledge 48.

Additionally, the corrugated upper plate 31 with the inclined or angled portions 31a and 31b, the top crest portion 35, the lower plate 33 and a first inward portion of the folded and overlapped peripheral edge 32 is positioned to rest on the insulation material 38. A second outward portion of the peripheral edge 32 rests on the intermediate ledge 49 and spaced from the intermediate screw channel 45. The dual solar cell unit defined by the upper plate 31 with the inclined or angled portions 31a and 31b, the top crest portion 35, the lower plate 33 and the folded and overlapped peripheral edge 32 is clamped down within the dual solar cell module housing unit 30 by a plurality of hold-down clamps 50 by screw 51 and washer 52 device. The screw 51 is screwed through the hold-down clamps 50 and through screw holes 49a in the intermediate ledge 49 to compress the peripheral edge 32 between the intermediate ledges 49 and the hold-down clamps 51 for adjusting and establishing the necessary compression force thereto. Also, this adjustable compression force will simultaneously press the above defined dual solar cell units into abutting engagement with the insulation materials 38. A screw head of screw 51 rests upon the washer 52 that rests upon an upper surface of the hold-down clamps 50. Also, the hold-down clamps 50 have a first end that rests upon the intermediate screw channel member 45 and a second end that rests upon the peripheral edge 32.

It can be seen from FIG. 8 that the upper ledge 46a serves as a rest member for supporting a cover glass 54 thereon. The cover glass has at least a ⅛" thickness and is held in place by at least a preformed one-piece 90 degree aluminum angular molding having a thickness that is at least 0.070". In addition, the cover glass 54 has a back cover that will be made from either galvanized or aluminum sheet metal or a composite material, if desired. The upper ledge 46a has a sealing caulking type or compound that is applied thereto, so that the cover glass 54 will be secured and made weather resistant by the combination of the sealing caulking type or compound and the downward pressure applied to the four-piece frame members 44 and the at least one-piece 90 degree angular molding 46. This at least one-piece 90 degree angular molding 46 includes an upper rim portion 53 that engages and extends along an upper surface of a peripheral end portion of the cover glass 54 and a downward perpendicular leg portion of the at least one-piece angular molding 46 that projects around the upper portion of the upper part of the frame members 44.

The at least one-piece angular molding 46 is secured to the upper portion of the upper part of the frame members 44 by at least 8 sheet metal screws 55 that extends through drilled holes (not shown) in the angular molding 46 and through the screw holes 46*b* of the frame members 44 at a lateral side thereof to tightly secure the cover glass 54 against the ledges 46*a* of the frame members 44. Note that the sheet metal screws are disposed at a spaced distance below the upper screw channel 45 to obviate any interference therewith.

Finally, the dual module frame members 44 are wire brushed to a polished finish. Then the inlet and outlet connectors are capped at the end portions 25 of the 45 degree angular copper tube member 24 and the dual solar module housing unit 30 is now ready for shipment.

Figure 9A:
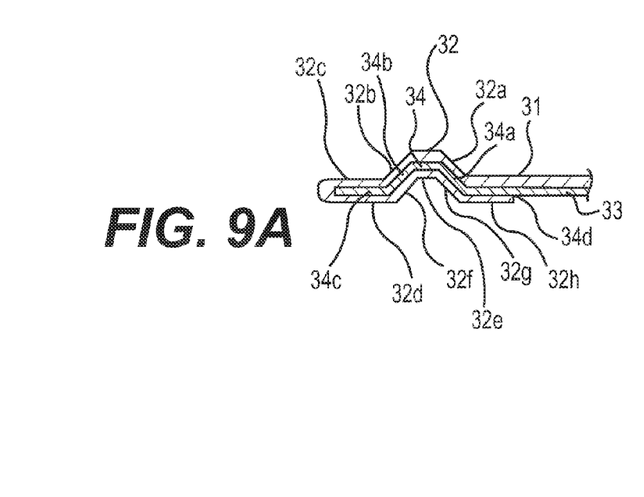
FIG. 9a illustrates a front cut view of the peripheral folded and overlapping edge at a left side perimeter of the present invention.
Figure 9B:
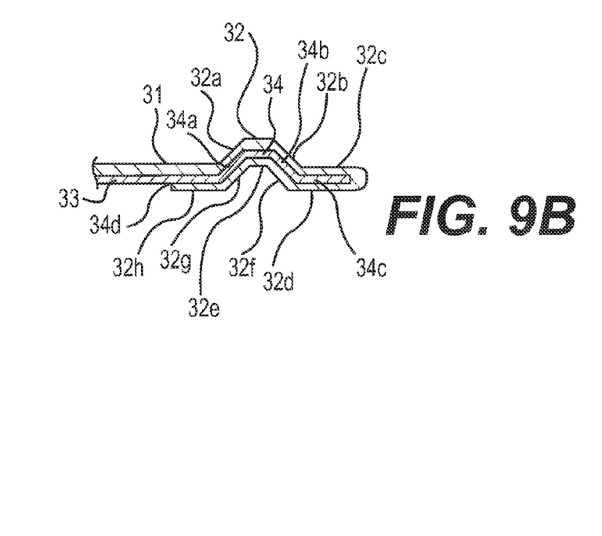
FIG. 9b illustrates a front cut view of the peripheral folded and overlapping edge at a right side perimeter of the present invention.

FIGS. 9A and 9B are similar in that represent an exploded sectional view of the left and right sides of the folded and overlapped peripheral edges 32. Since each are the same the following description will apply to both FIGS. 9A and 9B.

In FIGS. 9A and 9B, the upper plate 31 includes a first periphery edge raised protuberance 32 includes a pair angled or inclined leg portions 32*a* and 32*b*, with angled leg portion 32*a* being connected to an alternating crest inclined portion 20*b* and the angled leg portion 32*b* being connected to an upper overlapping portion 32*c* and a lower overlapping portion 32*d*. Extending inward of the lower overlapping portion 32*d* is a third raised protuberance 32*e*, with angled leg portion 32*f* being connected to the lower overlapping portion 32*d* and the angled leg portion 32*g* being connected to an outward extending overlapping edge end portion 32*h*, which is welded to an undersurface of the lower plate 33.

Lower plate 33 has a second periphery edge raised protuberance 34 disposed and nested between the first raised protuberance 32 and the third raised protuberance 32*e* of the upper plate 31. Note that the second periphery edge raised protuberance 34 includes a pair of angled or inclined leg portions 34*a* and 34*b*, with the angled leg portions 34*a* and 34*b* being pressed into an abutting engagement with mating surfaces of the cavity of the first raised protuberance 32, with the lower surface of the lower plate 33 inward of the raised protuberances 32, 32*e* and 34 being pressed across and against the plural open channels or cavities 36 of the plural alternating crest portions 35 for enclosing the flattened copper tubing 37 therein.

To rigidly secure the upper plate 31 and lower plate 33 together as a single cell unit, the third upstanding raised protuberance 32*e* is forcibly crimped or pressed into an underneath open cavity formed by the second raised protuberance 34 and the pair of angled or inclined leg portions 34*a* and 34*b*, while at the same time forcing the pair of angled or inclined leg portions 32*f* and 32*g* into an abutting engagement with mating surfaces within the open cavity of the second raised protuberance 34.

While the foregoing written description of the invention enables one of ordinary skill in the art to make and use what is considered presently to be the best mode thereof, those of ordinary skill will understand and appreciate the existence of variations, combinations, and equivalents of the specific embodiment, method, and examples herein. The invention should therefore not be limited by the above described embodiment method, and examples, but by all embodiments and methods within the scope and spirit of the invention as claimed.

What is claimed is:

1. A solar cell collector unit that materially contributes to a low cost and more efficient use and conservation of green energy comprising:

a first heat absorber plate having a plurality of stamped alternating corrugated crest portions on an upper surface and alternating aligned u-shaped open channels disposed on an under surface thereof below the corrugated crest portions that extends substantially along its entire length and being of a first dimension extended about an entire perimeter defining a first peripheral edge;

a second substantially flat heat absorber plate having a second dimension extended about a second entire perimeter defining a second peripheral edge, and the second dimension being less than the first dimension;

a flattened and substantially serpentine-shaped copper tubing being disposed within the alternating aligned u-shaped open channels for transferring a fluid medium there through;

the first and second heat plates are disposed in a face-to-face relationship with one another with the flattened and serpentine-shaped copper tubing within the open channels being compressed and sandwiched there between, while simultaneously closing off bottom portions of the open channels, the first plate having inlet and outlet connectors sealingly connected to inlets and outlets of the copper tubing such that the channels remain closed off; and the first peripheral edge extending beyond the second peripheral edge such that the entire perimeter of the first peripheral edge to fold and overlaps the entire perimeter of the second peripheral edge and the first peripheral edge deforms into raised nested protuberances of the second peripheral edge that provides stiffness and rigidity there about, while being crimped together by an uniform pressure to secure the first and second heat plates together as a single low cost solar cell unit, wherein the first peripheral edge raised protuberance includes a pair angled or inclined leg portions and an open cavity being formed there between, with one angled leg portion being connected to one of the alternating crest portions and the other angled leg portion being connected to an upper overlapping portion that forms a lower overlapping portion when folded over the second peripheral edge and deformed into a third raised protuberance, and the third raised protuberance has a pair of angled leg portions extending there from and an open cavity disposed there between, one angled leg portion being connected to a front portion of the lower overlapping portion and the other angled leg portion being connected to an outward extending overlapping edge end portion of the lower overlapping portion, which is secured to an undersurface of the second heat absorber plate.

2. The solar cell collector unit according to claim 1, wherein the first heat absorber plate has a plurality of stamped alternating inclined portions that extends angularly from each end of the alternating crest portions to alternating stamped valleys disposed there between and extend substantially along the entire length of the crest portions of the first heat absorber plate.

3. The solar cell collector unit according to claim 2, wherein the alternating stamped valleys and a mating surface of the second heat absorber plate is brought into contact with one another by a mechanical pressing and deforming operation that impresses a plurality of deformed dimple-like depressions there along to further lock the first and second heat absorber plates and the flattened spiral-shaped tubing together as a three part unit by adding additional stiffness and rigidity thereto.

4. The solar cell collector unit according to claim 1, wherein the raised protuberances defines four corners that are deformed and pressed down and sealed from a selected group consisting of welding, brazing, soldering or adhesive bonding.

5. The solar cell collector unit according to claim 1, wherein the first and second heat absorber plate is a thin sheet of metal material made and selected from a selected group comprising aluminum, stainless steel or galvanized.

6. The solar cell collector unit according to claim 1, wherein the second peripheral edge raised protuberance includes a pair of angled leg portions extending there from and an open cavity being formed there between, with the second raised protuberance and its angled leg portions being pressed into an abutting engagement with complimentary mating surfaces of the open cavity of the first raised protuberance.

7. The solar cell collector unit according to claim 1, wherein the third raised protuberance and its angled leg portions are pressed into abutting engagement with complimentary mating surfaces of the open cavity of the second raised protuberance and its angled leg portions, while at the same time pressing the second raised protuberance and its angled leg portions into abutting engagement with complimentary mating surfaces of the open cavity of the first raised protuberance and its angled leg portions into a nested configuration that forms four perimeter press down corners, which are secured together from any one of the group consisting of welding, brazing, soldering or adhesive bonding to rigidly clamp the first heat absorber plate and the second heat absorber plate together as a single cell unit.

8. The solar cell collector unit according to claim 1, wherein the solar cell unit includes at least a pair of cooperatively attached single solar cell units that define a dual solar heat collector module.

9. The solar cell collector unit according to claim 1, wherein the flattened copper spiral-shaped tubing having a pair of ends that is crimped closed and sealed from any one of the selected group consisting of welding, brazing, soldering and adhesive bonding.

10. The solar cell collector unit according to claim 8, wherein the dual solar heat collector module includes a frame assembly having four frame pieces of a specified design that are positioned perpendicular to one another forming an enclosed structure, the four frame pieces have at least three substantially spaced-apart screw through-channels therein that receives complimentary screws for securing the four frame pieces corners together as a housing unit, the at least three spaced-apart screw through-channels are disposed along an interior surface of all of the four frame pieces that extends substantially along its entire length, and the screw channels are in alignment with the complimentary frame corner screws to permit the frame corner screws to be inserted through the screw channels for securing the four frame pieces together.

11. The solar cell collector unit according to claim 10, wherein the four frame pieces have an upper section, an intermediate section and a lower section, the upper section has a first support ledge extending from an interior surface thereof and cooperatively associated with one of the at least three-spaced apart screw through-channels, the intermediate section has a second support ledge extending from an interior surface thereof and cooperatively associated with another one of the at least three-spaced apart screw through-channels, the lower section has a third support ledge defining a base portion that is cooperatively associated with the other one of the at least three-spaced apart screw through-channels, and a plurality of hold down clamps for holding down the entire perimeter of the nested peripheral edges of the solar cell units within the frame assembly, the plurality of hold down clamps includes at least three hold down clamps disposed along the nested peripheral edges of a front and back side of the pair of single solar cell units, at least a single hold down clamp disposed on the nested edge peripheral edge of each single solar cell units on sides opposite the front and back sides and at least a single hold down clamp for holding down the nested peripheral edges of the single solar cell units that are contiguous with one another within the frame assembly.

12. The solar cell collector unit according to claim 11, wherein the first support ledge, the second support ledge and the third support ledge are integrally formed on the interior surface of the four frame pieces, the upper section screw through-channel is formed integrally on an undersurface of the first support ledge, the intermediate section screw through-channel is formed integrally on the interior surface of the at least a pair of frame pieces, the lower section screw through-channel is formed integrally on an upper surface of the third support ledge, and the second support ledge being disposed below the intermediate screw through-channel in a contiguous relationship so that they can cooperate together with the plurality of hold down clamps on the front and back sides of the dual solar heat collector module for holding down the nested peripheral edges there along.

13. The solar cell collector unit according to claim 12, wherein the dual solar heat collector module further includes:
a cover glass member resting upon the first support ledge, the at least a pair of single solar cell units having their nested peripheral edges resting on the second support ledge, a back plate member resting on the third support ledge and extended to a positioned thereon adjacent to the screw through-channel disposed on the third support ledge, a pre-cut piece of insulation having a bottom surface resting on the back plate member and a top surface supporting the at least a pair of the single solar cell units thereon, the plurality of hold down clamps having a lower surface with one end resting upon the second screw through-channel and the other end resting upon the nested peripheral edges and clamped down with a screw element threaded through the hold down clamps and the second support ledge to adjust the necessary compression force on the nested peripheral edges and forcing the at least a pair of the single solar cell units against the top surface of the pre-cut piece insulation and a washer element being disposed between a head of the hold down screws.

14. The solar cell collector unit according to claim 13, wherein the dual solar heat collector module further includes:
at least a preformed one-piece 90 degree aluminum angular molding having an upper rim portion that engages and extends along an upper surface of a peripheral end portion of the cover glass and a downward perpendicular leg portion that projects around the upper portion of the upper part of the four-piece frame, the at least one-piece angular molding is secured to the upper portion of the upper part of the four-piece frame by at least pair of sheet metal screws that extends through drilled holes in the at least one-piece angular molding and through at least a pair of the screw corner holes of the four-piece frame at a lateral side thereof to tightly secure the cover glass against the first support ledges; and
the first support ledge has a sealing material applied thereto from any one of the selected group comprising a caulking type, sealing compound and adhesive bond type, so that the cover glass will be secured and made weather resistant by the combination of the sealing material and the downward pressure applied to the four-piece frame and the at least one-piece angular molding at the first support ledge.

15. The solar cell collector unit according to claim 12, wherein the dual solar heat collector module further includes:
a first connector hole disposed in the first alternating crest portions adjacent the nested peripheral edges of the front side of each one of the pair of single solar heat units and a second connector hole disposed in the last alternating crest portions adjacent the nested peripheral edges of the front side of each one of the pair of single solar heat units;
a third connector hole being disposed in a top portion of the flattened spiral-shaped copper tubing adjacent one of its sealed ends and a fourth connector hole being disposed in a top portion of the flattened spiral-shaped copper tubing adjacent the other one of its sealed ends; and
a pair of fluid medium connectors for each of the first and second single solar cell units, the pair of fluid medium connectors includes a first inlet connector and a second outlet connector, the first inlet connector is inserted through the first connector hole and attached to the top of the flattened spiral-shaped copper tubing above and in alignment with the third connector hole, the second inlet connector is inserted through the second connector hole and attached to the top of the flattened spiral-shaped copper tubing above and in alignment with the fourth connector hole, whereby fluid medium can pass from a fluid medium source to the first connector, through the flattened copper tubing and through the outlet connector of the first single solar heat unit, then into the inlet connector of the second single solar cell unit, through the flattened copper tubing and through the outlet connector of the second single solar cell unit to a heat utilization device.

16. The solar cell collector unit according to claim 15, wherein the dual solar heat collector module further includes:
a pair of angled copper connector tubing, a first one of the pair of angled copper connector tubing is connected to the first inlet connector of the first single solar cell unit and a second one of the pair of angled copper connector tubing is connected to the second outlet connector of the second single solar cell unit;
a pair of openings disposed within a front surface of the front frame piece adjacent the opposite corners thereof for receiving the pair of angled copper connector tubing there through; and
the pair of angled copper connector tubing is secured to the to the first inlet connector of the first single solar cell unit and the second one of the pair of angled copper connector tubing is connected to the second outlet connector of the second single solar cell unit by securing means from a selected group consisting of welding, brazing, soldering or adhesive bonding.

17. A method of assembling a solar cell collector apparatus that materially contributes to the development of renewable resources and to a more efficient use and conservation of green energy, which comprises:
providing a first thin metal sheet having a plurality of stamped alternating corrugated crest and valley portions on an upper surface and alternating aligned u-shaped open channels disposed on an under surface thereof below the corrugated crest portions and having a first size with a first peripheral edge about an entire perimeter;
providing a second substantially flat thin metal sheet having a second size with a second peripheral edge about a second entire perimeter, and the second size being less than the first size;
providing a flattened and substantially serpentine-shaped copper tubing that is disposed within the alternating aligned u-shaped open channels for transferring a fluid medium there through;
arranging the first and second thin metal sheets in a parallel manner and overlying one another with the flattened and serpentine-shaped copper tubing being disposed within the open channels and being compressed and sandwiched between the first and second thin metal sheets, while simultaneously closing off bottom portions of the open channels, the first plate having inlet and outlet connectors sealingly connected to inlets and outlets of the copper tubing such that the channels remain closed off; and
positioning the entire perimeter of the first peripheral edge so that it extends beyond the entire perimeter of the second peripheral edge and is folded over the entire perimeter of the second peripheral edge and deformed into raised nested protuberances of the second peripheral edge that provides stiffness and rigidity there about, while being crimped together to secure the first and second thin metal sheets together to form a single low cost solar cell apparatus, wherein the first peripheral edge raised protuberance includes a pair angled or inclined leg portions and an open cavity being formed there between, with one angled leg portion being connected to one of the alternating crest portions and the other angled leg portion being connected to an upper overlapping portion that forms a lower overlapping portion when folded over the second peripheral edge and deformed into a third raised protuberance, and the third raised protuberance has a pair of angled leg portions extending there from and an open cavity disposed there between, one angled leg portion being connected to a front portion of the lower overlapping portion and the other angled leg portion being connected to an outward extending overlapping edge end portion of the lower overlapping portion, which is secured to an undersurface of the second heat absorber plate.

18. A method of assembling a solar heat collector apparatus according to claim 17, wherein providing a plurality of circular like depressions that are solely stamped into the alternating valley portions and a mating surface of the second thin metal sheet to further secure and provide additional stiffness and rigidity to the single solar cell apparatus, the plurality of stamped circular like depressions are deformed into pin-less like rivets by a uniform contact pressure that is applied to the first thin metal sheet, the flattened copper tubing and the second thin metal sheet making all three parts into the single solar cell apparatus as a complete fabricated solar cell unit.

19. The solar cell collector unit according to claim 1, wherein a plurality of unassembled component parts defines a kit for easy assembly, which comprises:
a specially designed frame assembly having four pre-cut polished pieces;
a pair of complete solar cell units with capped inlet and outlet connectors;
nine (9) solar cell unit peripheral edge hold down clamps;
nine (9) hold down screws and washers;
a one-piece cover glass;
a polished angular molding;
one back plate member;
one piece of insulation material;

twelve (12) frame assembly corner screws;
eight (8) angular molding screws;
two (2) angled inlet and outlet connector copper tubing;
one flexible inlet and outlet connector tubing and two (2) hose sealing clamps;
a tube of sealing and weatherized compound; and
one (1) instructional guide included.

* * * * *